United States Patent [19]

Lessway

[11] Patent Number: 4,647,100
[45] Date of Patent: Mar. 3, 1987

[54] PARALLEL GRIPPER WITH ROLLER SUPPORTED GRIPPER ARMS

[75] Inventor: Richard J. Lessway, Farmington Hills, Mich.

[73] Assignee: Arobotech Systems, Inc., Warren, Mich.

[21] Appl. No.: 759,094

[22] Filed: Jul. 25, 1985

[51] Int. Cl.⁴ .............................................. B25J 15/08
[52] U.S. Cl. ................... 294/119.1; 294/88; 901/37; 901/39
[58] Field of Search ............... 294/86.4, 88, 93, 94, 294/106, 115, 116, 119.1, 103.1, 902; 51/103 R, 103 WH, 238 S; 82/38 R, 39; 269/32, 34; 409/165; 901/30-39

[56] References Cited

U.S. PATENT DOCUMENTS

| 3,371,953 | 3/1968 | Blatt | 901/37 X |
| 4,399,639 | 8/1983 | Lessway | 82/38 R X |
| 4,463,635 | 8/1984 | Hafla et al. | 82/38 R |
| 4,546,681 | 10/1985 | Owsen | 82/38 R |

FOREIGN PATENT DOCUMENTS

| 620617 | 3/1949 | United Kingdom | 294/115 |
| 1456703 | 11/1976 | United Kingdom | 294/88 |
| 632547 | 11/1978 | U.S.S.R. | 901/36 |

Primary Examiner—Johnny D. Cherry
Attorney, Agent, or Firm—Robert G. Mentag

[57] ABSTRACT

A gripping apparatus which includes a housing in which is slidably mounted a longitudinally movable gripper operator. A pair of gripper arms are rollably mounted on the gripper operator. Each gripper arm carries a gripper jaw engageable with a workpiece. The gripper jaws are moved along straight line travel paths into gripping engagement with a workpiece when the gripper operator is moved in one longitudinal direction, and they are disengaged correspondingly from the workpiece when the gripper operator is moved in the other longitudinal direction.

10 Claims, 11 Drawing Figures

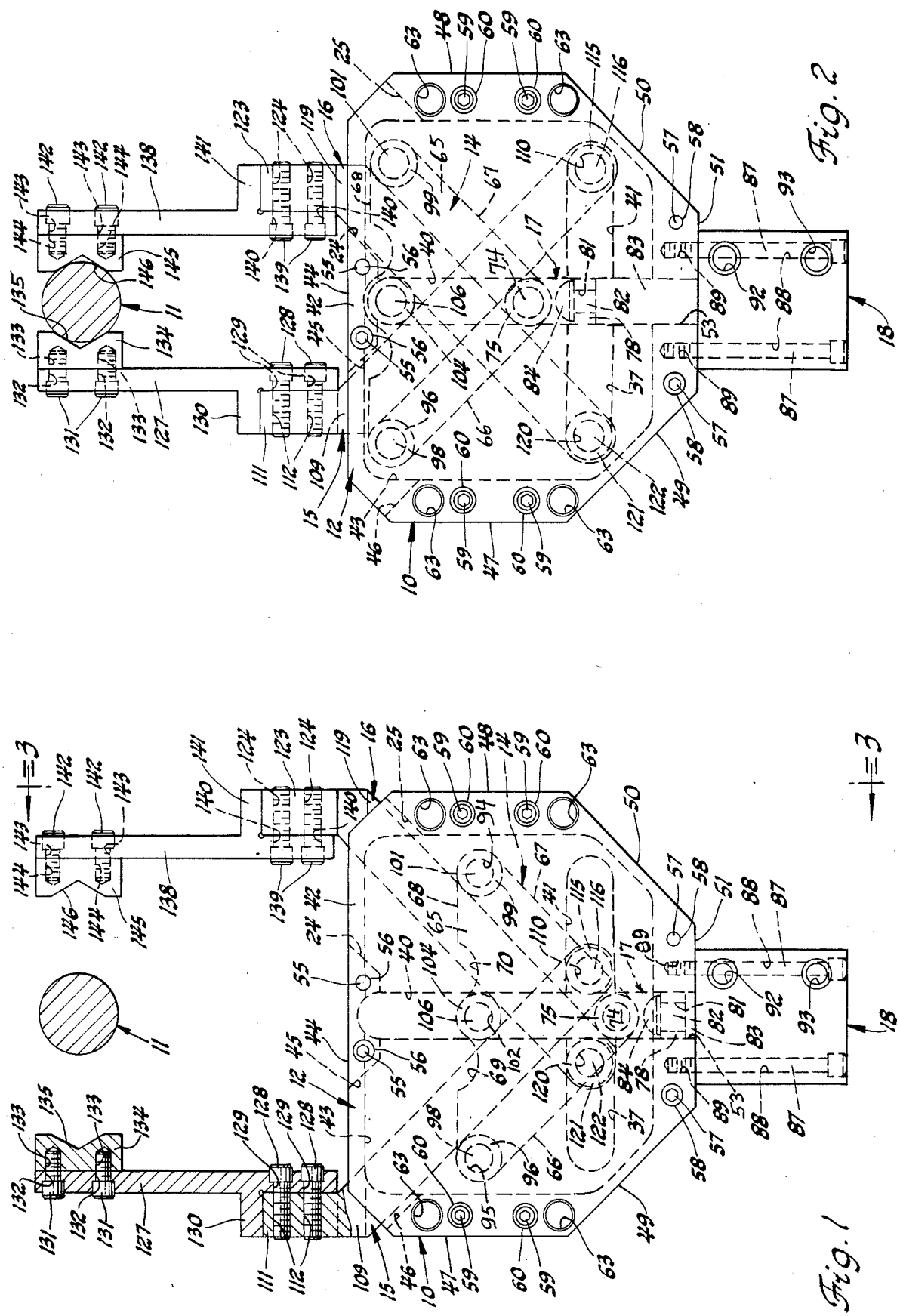

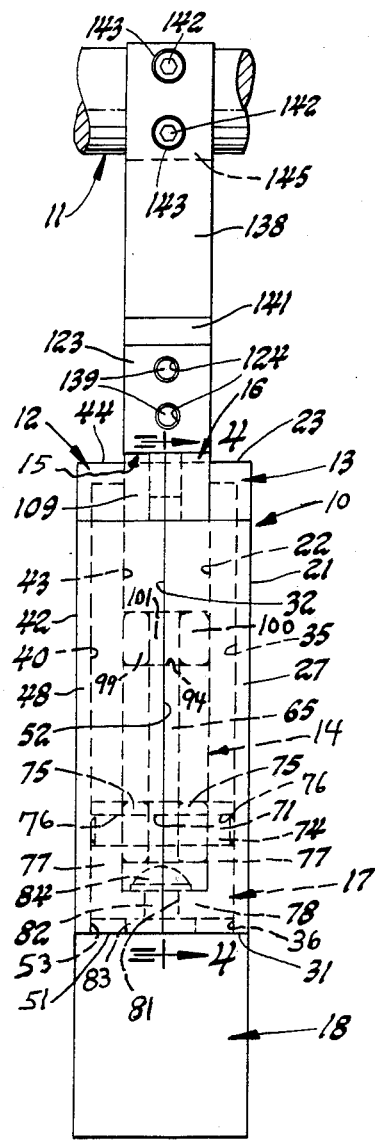
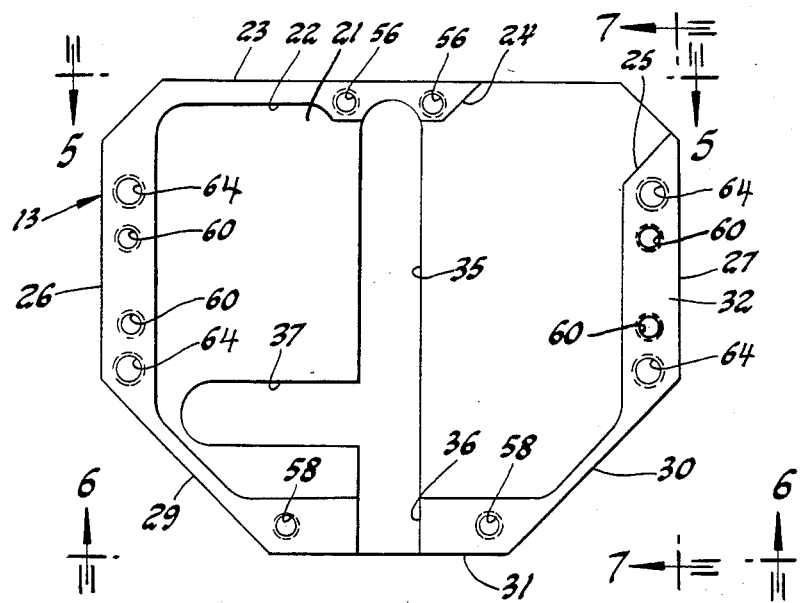
Fig. 4
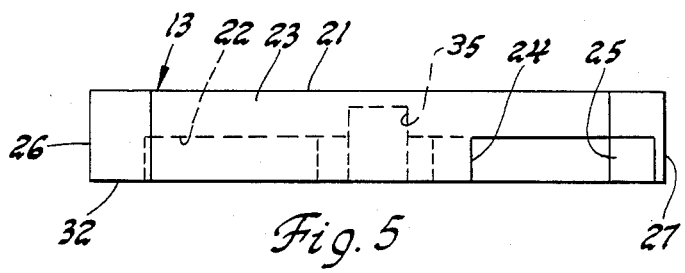
Fig. 5
Fig. 3
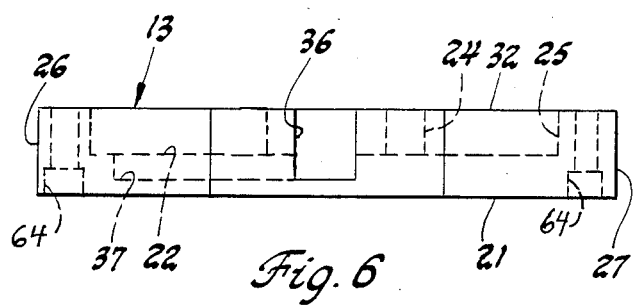
Fig. 6
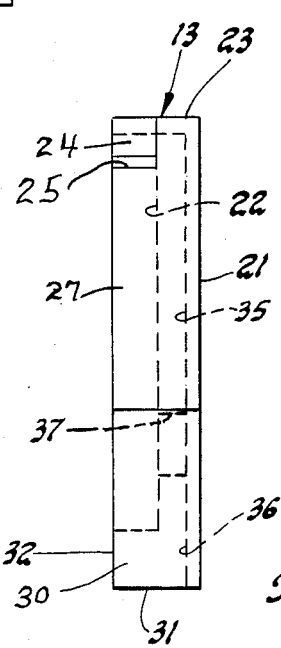
Fig. 7

PARALLEL GRIPPER WITH ROLLER SUPPORTED GRIPPER ARMS

BACKGROUND OF THE INVENTION

1. Technical Field

The field of art to which this invention pertains may be generally located in the class of devices relating to grippers or gripping devices.

2. Background Information

It is known in the robot gripper art to provide parallel motion gripping devices or grippers for gripping workpieces to move the workpiece between selected positions. A disadvantage of some of the prior art grippers is that, although it is advertised that they provide a parallel motion, the gripper arms for such grippers move in an arc. Accordingly, if the gripper arms on such grippers have a V-shaped gripping jaw or finger, then it is necessary to reprogram the controls for the gripping apparatus for each size workpiece, since with different diameters, the V-shaped jaws will be at different positions along the arcuate path through which the gripper jaws are moved. There are some true parallel motion grippers on the market, but a disadvantage of the last mentioned grippers is that they basically work off a wedge means, which provides only a very short stroke or movement for the gripping jaws. A disadvantage of the last mentioned prior art true parallel grippers is that they cannot be used for a wide range of different diameter workpieces, and accordingly, they lack versatility. It is also known in the prior art to provide a true centering steady rest, having a center wear pad and two side wear pads for movement into supporting engagement with a workpiece, as shown in U.S. Pat. No. 4,399,639.

SUMMARY OF THE INVENTION

In accordance with the present invention, a true parallel gripping apparatus or gripper is provided which includes two gripper arms, which may be provided with either inner or outer diameter gripping jaws or fingers for gripping a workpiece, and moving it between selected locations or work positions. The gripper of the present invention is adapted to hold various size diameter workpieces, without the need for readjusting or reprogramming the controls for the gripping apparatus, and without having to repeatedly find the longitudinal center of a workpiece. The gripping apparatus of the present invention provides true parallel movement of the gripping jaws for engaging a workpiece, and it also provides high gripping forces for holding a workpiece while it is moved between work positions.

The gripping apparatus of the present invention is also constructed and arranged so that a plurality of the same can be used in a stacked arrangement, so that the number of movements of a robot necessary to load and unload a workpiece can be reduced. The gripping apparatus of the present invention is compact in structure. It can be rotated about its longitudinal axis in a minimum of space, and it also has a flat configuration so that it can be moved down onto a workpiece carrying device, such as a pallet, and pick up a workpiece laying on a pallet, in an efficient manner. The present invention is adaptable to many uses and applications involving the handling, holding or manipulating of workpieces. Particular examples are robot arm grippers, pick and place units, work holding fixtures or steady rests and gauging heads.

The gripping apparatus of the present invention comprises a housing which includes a front cover plate, and a rear cover plate, and said cover plates include integral side, bottom and top plates. A gripper operator is rollably mounted inside of the housing, and it is operatively attached at its bottom end to a power means for moving the gripper operator longitudinally in the housing. A pair of gripper arms are rollably mounted on the gripper operator, and they are operatively connected to a cam means, whereby when the gripper operator is moved longitudinally in one direction in the housing, toward a workpiece, the gripper arms are moved toward each other in a linear or parallel path into gripping engagement with the outer diameter or surface of a workpiece, and when the gripper operator is moved longitudinally in the other direction in the housing, or away from the workpiece, the gripper arms are retracted along their respective linear or parallel travel paths from the workpiece to release the same. The movements of the gripper operator and the gripper arms are reversible to provide selective inner diameter or outer surface gripping actions on a workpiece.

BRIEF DESCRIPTION OF THE DRAWINGS

FIG. 1 is a front elevation view of a gripping apparatus, such as a robotic gripper apparatus made in accordance with the principles of the present invention, and showing the gripper arms in a workpiece released position.

FIG. 2 is a front elevation view, identical to FIG. 1, but showing the gripper arms moved to an outer diameter workpiece gripping position.

FIG. 3 is a right side elevation view of the gripper apparatus structure illustrated in FIG. 1, taken along the line 3—3 thereof, and looking in the direction of the arrows.

FIG. 4 is an elevation view of the inside surface of the rear cover plate employed in the gripper apparatus illustrated in FIG. 3, taken along the line 4—4 thereof, and looking in the direction of the arrows.

FIG. 5 is a top plan view of the rear cover plate illustrated in FIG. 4, taken along the line 5—5 thereof, and looking in the direction of the arrows.

FIG. 6 is a bottom plan view of the rear cover plate illustrated in FIG. 4, taken along the line 6—6 thereof, and looking in the direction of the arrows.

FIG. 7 is a right side elevation view of the rear cover plate illustrated in FIG. 4, taken along the line 7—7 thereof, and looking in the direction of the arrows.

DESCRIPTION OF THE PREFERRED EMBODIMENT

Figure 8:
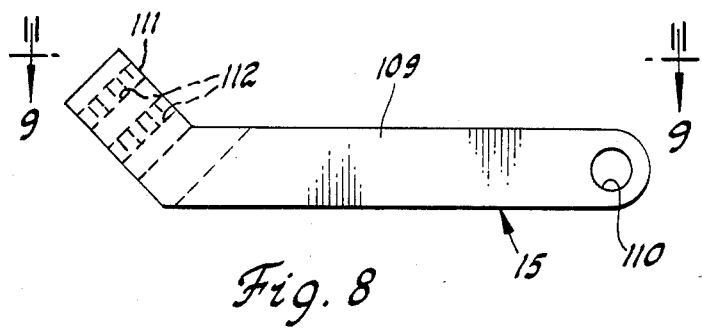
FIG. 8 is a side view of one of the two identical gripper arms employed in the gripper apparatus illustrated in FIGS. 1 and 2.
Figure 9:
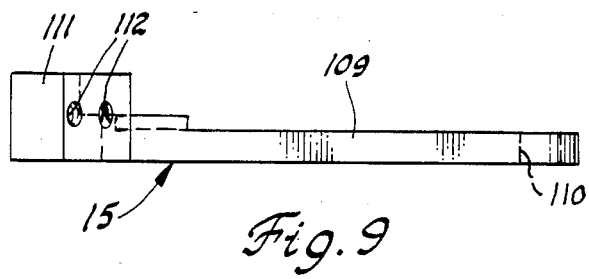
FIG. 9 is a top plan view of the gripper arm structure shown in FIG. 8, taken along the line 9—9 thereof, and looking in the direction of the arrows.

Referring now to the drawings, and in particular to FIG. 1, the numeral 10 generally designates an outer diameter, parallel gripper or gripping apparatus made in accordance with the principles of the present invention. The numeral 11 designates an elongated cylindrical workpiece, as for example, an elongated shaft which is to be gripped on the outer diameter thereof and moved between selective work positions or locations. The gripper apparatus 10 may be used for moving the workpiece 11 between machining operation locations, assembly operation locations, or other manufacturing operation locations. It will be understood that the gripper apparatus 10 would be carried on a conventional robot arm, which in turn would be moved by a conventional robotic power means.

As shown in FIGS. 1 through 3, the gripper apparatus of the present invention includes a housing comprising a front cover plate, generally indicated by the numeral 12, and a rear cover plate, generally indicated by the numeral 13 (FIG. 3). The pair of front and rear cover plates 12 and 13 are identically formed, and they are interchangeable. The cover plates 12 and 13 are made from any suitable material as, for example, aluminum.

As shown in FIGS. 1-3 and 10, the gripper apparatus 10 includes a gripper operator 14, which is rollably mounted within the aforedescribed housing, and which is made from any suitable material as, for example, aluminum. As shown in FIGS. 1 and 2, the gripper apparatus 10 includes a pair of gripper arms or members 15 and 16 which are identical in structure, and which are made from any suitable material as, for example, aluminum. As shown in FIGS. 1 and 2, the cover plates 12 and 13 are designated as the front and rear cover plates, respectfully, for purposes of describing the structure of the gripper apparatus 10 as it is positioned in the various figures in the drawings of this application. A power cylinder, generally indicated by the numeral 18, is operatively mounted on the lower end of the apparatus housing and it is operatively connected to the lower end of the gripper operator body 14 by a cylinder guide adaptor 17, as described in detail hereinafter. The power cylinder 18 may be of any suitable type as, for example, it may be a pneumatic or hydraulic cylinder.

As shown in FIG. 4, the rear cover plate 13 includes a rear wall plate 21. The rear cover plate 13 further includes an integral top end plate 23, a pair of integral upper side plates 26 and 27, a pair of lower side plates 29 and 30 which slope downwardly and converge toward each other and have their lower ends integral with a bottom integral plate 31. The top and bottom end plates 23 and 31, and the integral side plates 26, 27, 29, and 30 extend inwardly from the rear wall plate 21, toward the front cover plate 12, and they form an inner recess or chamber 22. As shown in FIG. 4, a slot or opening is formed through the right side of the integral top end plate 23, and the ends of said slot are indicated by the numerals 24 and 25. As shown in FIGS. 4 through 7, the outer surface of the top and bottom end plates 23 and 31, respectively, and the side plates 26, 27, 29 and 30 have a common inner surface or face 32 for joining with a similar inner face 52 (FIG. 3) on the front cover plate 12.

As shown in FIGS. 4 through 7, the rear cover plate 13 is provided with a centrally disposed, longitudinally extended cam slot 35, which is rectangular in cross section, and which extends from the top end plate 23 downwardly to communicate with a similar size, aligned slot 36 which is formed through the bottom end plate 31. A transverse cam slot 37 is also formed in the inner surface of the rear wall plate 21, and its inner end communicates with the longitudinal cam slot 35, and the outer end thereof extends toward the side plates 26 and 29. The cross sectional shape of the cam slot 37 is also rectangular and made to the same size as the longitudinal cam slot 35

As shown in FIGS. 1 and 3, the front cover plate 12 includes a front wall plate 42. The front cover plate 12 further includes an integral top end plate 44, a pair of integral upper side plates 47 and 48, and a pair of lower side plates 49 and 50, which slope downwardly and converge toward each other and have their lower ends integral with a bottom integral plate 51. The top and bottom end plates 44 and 51, and the integral side plates 47, 48, 49 and 50 extend inwardly from the front wall plate 42 and they form an inner recess or chamber 43. As shown in FIG. 1, a slot or opening is formed through the left side of the integral top end wall 44, and the ends of said slot are indicated by the numerals 45 and 46. It will be understood from FIG. 3, that the top and bottom end plates 44 and 51, respectively, and the side plates 47 through 50 have a common inner surface or face 52, for joining with the common inner face 32 on the rear cover plate 13.

As shown in FIGS. 1 and 3, the front cover plate 12 is provided with a centrally disposed, longitudinally extended cam slot 40, which is rectangular in cross section, and which extends from the top end plate 44 downwardly to communicate with a similar size, aligned slot 53 formed through the bottom end plate 51. A transverse cam slot 41 is also formed in the inner surface of the front cover wall plate 42, and its inner end communicates with the longitudinal cam slot 40, and the outer end thereof extends towards the side plates 48 and 50. The cross section shape of the transverse cam slot 41 is also rectangular, and it is made to the same cross section size as the longitudinal cam slot 40.

As shown in FIGS. 1 and 2, the front cover plate 12 is secured to the rear cover plate 13 at the top end thereof, by a pair of suitable machine screws 55, which are operatively mounted in the holes 56 that extend through both of the cover plates 12 and 13. For example, the left machine screw 55, as shown in FIGS. 1 and 2, would slidably pass through the end of the hole 56 in the front cover plate 12 and be threadably engaged into the threaded other end of the hole 56 in the rear cover plate 13. It is also shown in FIGS. 1 and 2 that the right machine screw 55 extends through the rear cover plate 13 and into the threaded portion of the hole 56 in the front cover plate 12. The front cover plate 12 is further secured to the rear cover plate 13 at the bottom ends thereof, by a pair of similar machine screws 57 which pass through suitable holes 58 in the bottom end walls 51 and 31, and into the opposite ends of the holes 58, which are threaded for threaded engagement by the threaded parts of the screws 57. As shown in FIGS. 1 and 2, the front cover plate 12 and the rear cover plate 13 are further secured together, on the sides thereof, by a plurality of suitable machine screws 59 which each pass through one end of a hole 60 in the front cover plate side walls 47 and 48 and into threaded engagement with the threaded ends of the holes 60 in the side walls 26 and 27, respectively, in the rear cover plate 13 (FIG. 4). As shown in FIGS. 1, 2 and 4, the gripper apparatus 10 is provided with a plurality of mounting holes 63 which are formed through the front cover side plates 47 and 48, and which are aligned with threaded mating mounting holes 64 that are formed through the side plates 26 and 27 in the rear cover plate 13 (FIG. 4).

Figure 10:
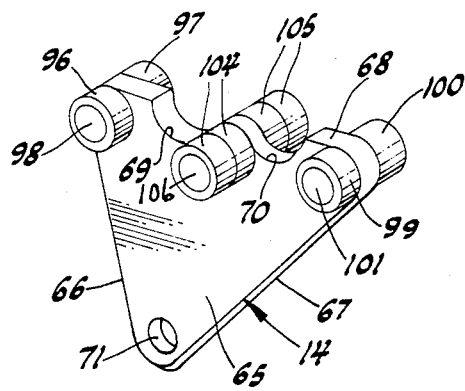
FIG. 10 is an elevation perspective view of the gripper operator body employed in the gripper apparatus structure of FIGS. 1 and 2.

As shown in FIG. 10, the gripper operator 14 includes a triangular body or plate 65 which is adapted to be centrally mounted in the space between the front cover plate 12 and the rear cover plate 13. The space between said cover plates is formed by the chambers 43 and 22, which have been previously described as being formed in the front and rear cover plates 12 and 13, respectively. The converging sides of the gripper operator body 65 are designated by the numerals 66 and 67, and the top end is indicated by the numeral 68. A pair of equally spaced apart U-shaped recesses 69 and 70 are formed in the top end 68 of the gripper operator body 65. A hole 71 is formed through the lower end of the gripper operator body 65, at the junction point of the converging sides 66 and 67.

Figure 11:
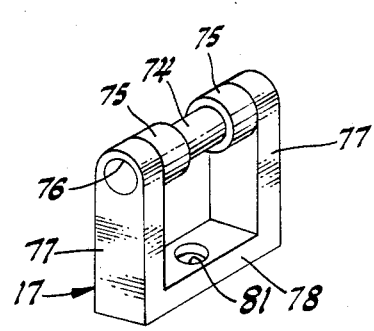
FIG. 11 is an elevation perspective view of a cylinder guide adaptor employed in the gripper apparatus structure of FIGS. 1 and 2.

The cylinder guide adaptor 17 for moving the gripper operator 14 longitudinally in the gripper apparatus housing is shown in detail in FIG. 11. The cylinder guide adaptor 17 includes a transverse base plate 78 and a pair of integral, spaced apart longitudinal arms 77, which are disposed parallel to each other, and disposed longitudinally in the gripper apparatus housing (FIG. 3). A transverse hole 76 is formed through the free end of each of the adaptor arms 77. A transverse shaft 74 is operatively mounted through the adaptor leg holes 76 and retained in place by any suitable means, as by a press fit. A pair of rollers 75 are rotatably mounted on the shaft 74, in spaced apart positions, with their outer sides in abutment with the inner faces of the adaptor arms 77.

As shown in FIG. 3, the cylinder guide adaptor 17 is operatively attached to the lower end of the gripper operator body 65 by having the shaft 74 extended through the hole 71 in the lower end of the gripper operator body 65. The rollers 75 are thus positioned on opposite sides of the lower end of the gripper operator body 65. The cylinder guide adaptor 17 is positioned to be moved longitudinally in the gripper apparatus housing in the longitudinal cover plate slots 40 and 35, and the communicating lower end slots 53 and 36. As shown in FIGS. 1 through 3 and 11, the transverse base plate 78 of the cylinder guide adaptor 17 has a hole 81 formed therethrough, through which is mounted the upper end of a reduced diameter end 82 of the usual cylinder rod 83 of the power cylinder 18. The cylinder rod reduced diameter end 82 has formed thereon, an integral, enlarged head 84 which seats on the upper side of the adaptor transverse plate 78, and with the upper end of the cylinder rod 83 in abutment against the lower side of the adaptor transverse plate 78.

The power cylinder 18 is fixedly secured in place on the lower end of the gripper apparatus housing by a plurality of suitable cap screws 87. The cap screws 87 are mounted through bores 88 formed through the body of the housing of the power cylinder 18, and with their threaded ends mounted in threaded holes 89 formed in the lower end walls 51 and 31 of the front and rear cover plates 12 and 13, respectively. As shown in FIGS. 1 and 2, the power cylinder 18 is provided with the usual ports 92 and 93 for attachment to suitable conduits for conveying pressurized fluid, such as air or hydraulic oil, into the cylinder 18, for operating the cylinder rod 83 between the positions shown in FIGS. 1 and 2. The pressurized fluid admitted into the upper port 92 moves the gripper operator 14 downwardly into the position shown in FIG. 1 to open the gripper arms 15 and 16.

The pressurized fluid that is admitted into the lower port 93 operates the cylinder 18 to move the cylinder rod 83 upwardly, so as to move the gripper arms 15 and 16 sidewardly inward, in a linear or parallel path, to grip the outer diameter of the workpiece 11.

As best seen in FIG. 10, the gripper operator body 65 has a roller 96 operatively mounted on one side thereof, and a roller 97 operatively mounted on the other side thereof at the upper corner or junction between the side 66 and the top end 68. As illustrated in FIG. 1, the gripper body plate 65 has a transverse hole 95 formed therethrough at the upper left hand corner through which is operatively mounted a roller shaft 98, and on the opposite ends thereof of which are rotatably mounted the rollers 97 and 98. As shown in FIG. 1, the upper right hand corner or termination point between the gripper body plate side 67 and the top end 68, is provided with a transverse hole 94 through which is operatively mounted a roller shaft 101. As shown in FIG. 10, the roller shaft 101 carries the rollers 99 and 100, on the opposite ends thereof, on the opposite sides of the gripper body plate 65. As illustrated in FIG. 1, a transverse hole 102 is formed through the upper end of the gripper body plate 65, in a position parallel to the holes 94 and 95 and equally spaced therefrom, and on the same axial plane. As shown in FIG. 1, a roller shaft 106 is operatively mounted through the hole 102. As shown in FIG. 10, a pair of rollers 104 are rotatably mounted on one end of the shaft 106, on one side of the body plate 65, and a pair of rollers 105 are mounted on the other end of the shaft 106, on the other side of the body plate 65. As shown in FIG. 3, the gripper operator 14 is slidably mounted in the cover part recesses 43 and 22, and in sliding engagement with the inner surfaces of the front and rear cover wall plates 42 and 21, respectively.

As shown in FIG. 1, the gripper arm 15 includes an angular portion 109 and an integral longitudinal portion 111. The angular portion 109 is disposed at an angle of 45 degrees from the longitudinal axis of the gripper operator 14, and it is rollably mounted on the front side of the gripper operator body 65, as viewed in FIG. 1. The gripper arm angular portion 109 is rollably mounted between the rollers 96, 104 and 75. As shown in FIGS. 1 and 8, the gripper arm 15 is provided with a hole 110 at the inner end thereof. The longitudinal portion 111 of the gripper arm 15 is provided with a pair of transverse threaded holes 112. As shown in FIG. 1, a shaft 116 has one end fixed in the hole 110 and it is secured in place by any suitable means, as by a press fit. A suitable roller 115 is rotatably mounted on the portion of the shaft 116 that extends outwardly from the gripper arm portion 109 and toward the front cover wall plate 42. The roller 115 comprises a cam roller and it is rollably mounted in the transverse cam slot 41 formed in the inner surface of the front cover wall plate 42.

As is shown in FIG. 1, the gripper arm 16 includes an angular portion 119 which is provided at its lower inner end with a transverse hole 120. A shaft 122 is fixedly mounted in the hole 120 by any suitable means, as by a press fit, and a cam roller 121 is rotatably mounted on the shaft 122 which extends rearwardly, as shown in FIG. 1 and toward the rear cover wall plate 21. The can roller 121 is rollably mounted in the transverse cam slot 37 which is formed in the inner surface of the rear cover wall plate 21. The gripper arm 16 is provided with the longitudinally extended portion 123 which is provided with a pair of transverse threaded holes 124.

As shown in FIGS. 1 and 2, the gripper arm 15 has operatively mounted thereon a gripper jaw 134. The gripper jaw 134 is carried on a mounting arm 127, which is releasably secured to the longitudinal gripper arm portion 111 by a pair of suitable machine screws 128. The machine screws 128 are slidably mounted through bores 129, which are formed through the lower end of the mounting arm 127, and they extend into threaded engagement with the threaded bores 112 that are formed through the longitudinal gripper arm portion 111. The mounting arm 127 has an integral, outwardly extended, perpendicular flange 130, which rests on the upper end of the longitudinal gripper arm portion 111. The gripper jaw 134 is releasably secured to the outer end of the mounting arm 127 by a pair of suitable machine screws 131, which pass through bores 132 formed through the upper end of the mounting arm 127 and into threaded engagement with threaded bores 133, which are formed in the outer side of the jaw 134. The gripper jaw 134 is shown as being provided with a V-shaped seat 135 for engagement with the rounded outer diameter or surface of a cylindrical workpiece, as the workpiece 11.

As shown in FIGS. 1 and 2, the gripper arm 16 has operatively mounted thereon a gripper jaw 145. The gripper jaw 145 is carried on a mounting arm 138, which is releasably secured to the longitudinal gripper arm portion 123 by a pair of suitable machine screws 139. The machine screws 139 are slidably mounted through bores 140 which are formed through the lower end of the mounting arm 138, and they extend into threaded engagement with the threaded bores 124 that are formed through the gripper arm portion 123. The mounting arm 138 has an integral, outwardly extended, perpendicular flange 141 which rests on the upper end of the gripper arm longitudinal portion 123. The gripper jaw 145 is releasably secured to the outer end of the mounting arm 138 by a pair of suitable machine screws 142, which pass through bores 143 formed through the upper end of the mounting arm 138 and into threaded engagement with threaded bores 144, which are formed in the outer side of the gripper jaw 145. The gripper jaw 145 is shown as being provided with a V-shaped seat 146 for engagement with the rounded outer surface or outer diameter of a cylindrical workpiece, as the workpiece 11.

The mounting arms 127 and 138, and the gripper jaws 134 and 145, may be made from any suitable material as, for example, aluminum.

In use, the gripper apparatus 10 would be operatively mounted on a conventional robotic arm, or similar structure, for moving said apparatus, as desired. In order to grip the workpiece 11, pressurized fluid is admitted into the lower port 93 for operating the power cylinder 18 in an upward direction, so as to move the gripper operator 14 upwardly, to the position shown in FIG. 2, for bringing the gripper jaws 134 and 145 into gripping engagement with the workpiece 11. The robotic arm may then be moved to a desired position for putting the workpiece 11 in a selected position for a sequential manufacturing operation, or the like. At the new selected position, the pressurized fluid would be exhausted from the lower port 93, and pressurized fluid would be admitted into the upper port 92 for operating the power cylinder 18 in a downward direction to move the gripper operator 14 downwardly, to the position shown in FIG. 1, for releasing the workpiece 11.

The gripping seats or faces 135 and 146 on the gripper jaws 134 and 145, respectively, may be changed in accordance with the outer shape of a workpiece 11 to be gripped by the gripper apparatus 10. For example, if the workpiece 11 were to have parallel straight sides, then the gripper jaws 134 and 145 would be provided with straight gripping faces instead of the V-shaped seats or faces 135 and 146.

The range of the linear movement of the gripper jaws 134 and 145 may be controlled or changed by merely adding different size gripper jaws, which may be shorter or longer, in the transverse direction, as desired. The linear or parallel inward and outward movements of the gripper jaws 134 and 145 are effected by the 45 degree disposition of the gripper arm portions 109 and 119 of the gripper arms 15 and 16, respectively, and the mating 45 degree disposition of the aforedescribed cam rollers on the gripper operator 14 which also function with the cam rollers 121 and 115 in the transverse cam slots 37 and 41, respectively. The rollers carried on the gripper operator 14 for retaining the gripper arm portions 109 and 119 in a 45 degree deposition provide a rolling action relative to said gripper arms, with a minimum of friction between the moving internal moving parts in the gripper apparatus housing. The aforedescribed roller action of the internal parts of the gripper apparatus 10 of the present invention provides a low friction gripper apparatus which results in obtaining an optimum gripping force from the power cylinder 18.

It will be understood that the gripper jaws 134 and 145 may be selectively mounted on the outer side of the mounting arms 127 and 138, to provide an inner diameter gripper apparatus. In an embodiment with the gripper jaws 134 and 145 mounted on the outer side of the mounting arms 127 and 138, the movement of the gripper operator 14 would be reversed for releasing and gripping the internal diameter of a workpiece. That is, the power cylinder 18 would be operated so as to move the gripper jaws 134 and 145 inwardly to a position adjacent each other, and then to grip the inner diameter of a workpiece the gripper arms 15 and 16 would be moved outwardly by the power cylinder 18, as shown by the outward positions in FIG. 1, until the gripper jaws 134 and 145 engage the inner diameter of the workpiece.

What is claimed is:

1. A gripping apparatus, characterized in that it comprises:
   (a) a housing having a longitudinal and a transverse axis;
   (b) a gripper operator, having a longitudinal and a transverse axis, and further having a front side surface and a rear side surface, slidably mounted in said housing for longitudinal movement therein;
   (c) a pair of gripper arms rollably supported in a criss-cross manner by rollers carried on said gripper operator, with one gripper arm supported on rollers on one of said side surfaces of the gripper operator and the other gripper arm supported on rollers on the other of said side surfaces of the gripper operator;
   (d) said gripper arms each carrying a gripper jaw for gripping engagement with a workpiece;
   (e) cam means for restraining each of said gripper arms against movement relative to the gripper operator axially of the longitudinal axis of the gripper operator but which permits crosswise movement of the gripper arms relative to the longitudinal axis of said gripper operator, and toward and away from a workpiece, to move the gripper jaws carried by the gripper arms in straight line travel paths; and, (f) means for moving said gripper operator longitudinally in said housing, whereby when said gripper operator is moved in one longitudinal direction, the gripper jaws on the gripper arms are moved along straight line travel paths into gripping engagement with a workpiece, and when the gripper operator is moved in the other longitudinal direction, the gripper jaws are retracted from the workpiece along the same straight line travel paths.

2. A gripping apparatus, as defined in claim 1, characterized in that said housing comprises:
 (a) a front cover plate and a rear cover plate; and,
 (b) each of said cover plates includes integral side, top and bottom plates.

3. A gripping apparatus, as defined in claim 2, characterized in that and comprising, said gripper arms being each rollably disposed at an acute angle relative to the longitudinal axes of the housing and gripper operator.

4. A gripping apparatus, as defined in claim 3, characterized in that and comprising, power means for moving said gripper operator.

5. A gripping apparatus, as defined in claim 4, characterized in that said cam means comprises:
 (a) a first crosswise cam slot formed in one of said cover plates and a cam roller rollably mounted in said first crosswise cam slot and being attached to a first one of said gripper arms; and,
 (b) a second crosswise cam slot formed in the other of said cover plates, and a cam roller rollably mounted in said second crosswise cam slot and being attached to a second one of said gripper arms.

6. A gripping apparatus, as defined in claim 5, characterized in that and comprising, gripper jaws being detachably mounted on said gripper arms.

7. A gripping apparatus as defined in claim 6, characterized in that and comprising, gripper jaw straight travel paths being each disposed at a right angle to the longitudinal axis of said housing.

8. A gripping apparatus, characterized in that it comprises:
 (a) a housing having a longitudinal and a transverse axis;
 (b) a gripper operator, having a longitudinal and a transverse axis, and further having a front side surface and a rear side surface, slidably mounted in said housing for longitudinal movement therein;
 (c) a pair of gripper arms rollably supported in a criss-cross manner on said gripper operator, with one gripper arm on one of said side surfaces of the gripper operator and the other gripper arm on the other of said side surfaces of the gripper operator;
 (d) said gripper arms each carrying a gripper jaw for gripping engagement with a workpiece;
 (e) cam means for restraining each of said gripper arms against movement relative to the gripper operator axially of the longitudinal axis of the gripper operator but which permits crosswise movement of the gripper arms relative to the longitudinal axis of said gripper operator, and toward and away from a workpiece, to move the gripper jaws carried by the gripper arms in straight line travel paths;

(f) means for moving said gripper operator longitudinally in said housing, whereby when said gripper operator is moved in one longitudinal direction, the gripper jaws on the gripper arms are moved along staight line travel paths into gripping engagement with a workpiece, and when the gripper operator is moved in the other longitudinal direction, the gripper jaws are retracted from the workpiece along the same straight line travel paths;

(g) said housing comprising a front cover plate and a rear cover plate, and each of said cover plates including integral side, top and bottom plates;

(h) said gripper arms being each rollably supported at an acute angle relative to the longitudinal axes of the housing and gripping operator;

(i) power means for moving said gripper operator;

(j) said cam means comprising a first crosswise cam slot formed in one of said cover plates and a cam roller rollably mounted in said first crosswise cam slot and being attached to a first one of said gripper arms, and a second crosswise cam slot formed in the other of said cover plates, and a cam roller rollably mounted in said second crosswise cam slot and being attached to a second one of said gripper arms;

(k) gripper jaws detachably mounted on said gripper arms; and, (l) said gripper operator comprises,
 (1) a gripper operator body on which are formed said front and rear side surfaces; and,
 (2) roller support means operatively mounted on each of said side surfaces of said gripper operator body for rollably supporting one of said gripper arms on each of said side surfaces.

9. A gripping apparatus as defined in claim 8, characterized in that, said means for moving said gripper operator comprises, a cylinder guide adaptor operatively connecting said gripper operator body to said power means.

10. A gripping apparatus characterized in that it comprises:
 (a) a housing having a longitudinal and a transverse axis;
 (b) a gripper operator having a longitudinal and a transverse axis, and further having a front side surface and a rear side surface, slidably mounted in said housing for longitudinal movement therein;
 (c) a pair of gripper arms rollably mounted in a crisscross manner on said gripper operator, with one gripper arm on one of said side surfaces of the gripper operator and the other gripper arm on the other of said side surfaces of the gripper operator;
 (d) said gripper arms each carrying a gripper jaw for gripping engagement with a workpiece;
 (e) cam means for restraining each of said gripper arms against movement relative to the gripper operator axially of the longitudinal axis of the gripper operator but which permits crosswise movement of the gripper arms relative to the longitudinal axis of said gripper operator, and toward and away from a workpiece, to move the gripper jaws carried by the gripper arms in straight line travel paths;
 (f) means for moving said gripper operator longitudinally in said housing, whereby when said gripper operator is moved in one longitudinal direction, the gripper jaws on the gripper arms are moved along straight line travel paths into gripping engagement with a workpiece, and when the gripper operator is moved in the other longitudinal direction, the gripper jaws are retracted from the workpiece along the same straight line travel paths;

(g) said housing comprising a front cover plate and a rear cover plate, and each of said cover plates includes integral side, top and bottom plates;

(h) said gripper arms are each rollably disposed at an acute angle relative to the longitudinal axes of the housing and gripper operator;

(i) power means for moving said gripper operator;

(j) a first crosswise cam slot formed in one of said cover plates and a cam roller rollably mounted in said first crosswise cam slot and being attached to a first one of said gripper arms;

(k) a second crosswise cam slot formed in the other of said cover plates, and a cam roller rollably mounted in said second crosswise cam slot and being attached to a second one of said gripper arms;

(l) gripper jaws detachably mounted on said gripper arms;

(m) said gripper operator comprises, a gripper operator body on which are formed said front and rear side surfaces, roller support means operatively mounted on each of said side surfaces of said gripper operator body for rollably supporting one of said gripper arms on each of said side surfaces;

(n) said means for moving said gripper operator comprises, a cylinder guide adaptor operatively connecting said gripper operator body to said power means; and, (o) said cylinder guide adaptor comprises,
  (1) a base plate connected to the power means;
  (2) a pair of spaced apart, longitudinal arms having one of their ends integrally connected to the base plate, and the other of their ends pivotally attached to the gripper operator body by a transverse shaft; and,
  (3) a roller carried on the transverse shaft on each side of the gripper operator body for rolling support of the gripper arms on said each side of the gripper operator body.

* * * * *